UNITED STATES PATENT OFFICE.

ROBERT J. WALKER, OF SAN FRANCISCO, CALIFORNIA.

LUTING COMPOSITION.

1,364,224. Specification of Letters Patent. Patented Jan. 4, 1921.

No Drawing. Application filed September 25, 1919. Serial No. 326,265.

*To all whom it may concern:*

Be it known that I, ROBERT J. WALKER, a citizen of the United States, residing at San Francisco, in the county of San Francisco and State of California, have invented new and Improved Luting Compositions, of which the following is a specification.

My invention has for its purpose to provide a simple, inexpensive and easily manipulated or applied luting composition consisting of a plastic body adapted for being readily shaped up into welding sticks and which is particularly useful for making permanent repairs on any metal, iron, steel or aluminum, and which will positively fill blow holes, sand holes in castings of any kind, transmission cases, water jackets, boilers, furnaces, radiators, gas engines, &c.

Another object of my invention is to provide an improved luting compound whose constituent parts are such that, when mixed or formed into the shape of a welding stick, they can be readily applied for repair work, as before mentioned, and in which the parts are such that, when worked up into the manufactured article, the article is not susceptible of disintegration by contact with or immersion in salt water or oil and, when applied, will assume the desired hardness so as not to come off the article cemented therewith.

Another and essential feature of my invention is to provide a composition of the general character mentioned which, when applied to the parts to be welded together, expands in the weld and forms practically a part of the metal being welded.

With the above objects in view, my invention is an improved luting compound that embodies the ingredients composed of the following elements:

In carrying out my invention, I prepare a composition by mixing together metallic powder, sulfur, emery and graphite. These ingredients are preferably mixed in the following proportion:

Sulfur _____ 8 parts.
Emery _____ 3 parts.
Metallic powder such as aluminum
  or other suitable metal _____ 3 parts.
Graphite or carbon _____ 2 parts.
Borax _____ 2 parts.

The ingredients stated are thoroughly mixed, heated and molded and then rolled or otherwise reduced to a round stick, preferably ¼ of an inch in diameter and six inches long.

In practice, one ounce of the plastic material makes a stick portion of one inch.

In using the welding stick, the casting or other object to be welded is first heated to about three hundred degrees Fahrenheit.

The welding stick is then applied to the spot to be repaired and, as it melts, it is, in any convenient manner, pushed into the break, sand or blow hole, &c.

After cooling, the welding substance can be smoothed and the rough parts removed by filing.

My welding stick is also very useful on hard wood or glass tubes.

When made up, as stated, the complete article, the stick, is dark in color. By cutting down the quantity of graphite or carbon, the color may be made lighter or by omitting the carbon or graphite entirely, the welding stick will be of light color.

What I claim is:—

1. A luting composition containing the following elements, in substantially the proportions stated, viz. sulfur eight parts, emery three parts, metallic powder three parts, borax two parts, the whole intermixed and formed into a stick form.

2. A luting composition containing the following elements in substantially the proportions stated, namely, sulfur eight parts, emery three parts, metallic powder three parts, borax two parts, and carbon in suitable quantity for coloring, the whole intermixed and formed in a stick shape.

ROBERT J. WALKER.